United States Patent [19]

Chang

[11] 4,426,476

[45] Jan. 17, 1984

[54] TEXTILE TREATMENTS

[75] Inventor: John C. C. Chang, New Brighton, Minn.

[73] Assignee: Minnesota Mining and Manufacturing Company, St. Paul, Minn.

[21] Appl. No.: 345,408

[22] Filed: Feb. 3, 1982

[51] Int. Cl.$^3$ .............................................. C08F 5/10
[52] U.S. Cl. .................................. 524/288; 524/307; 524/316; 524/319; 524/168
[58] Field of Search ............... 524/288, 307, 316, 319; 526/253, 254, 255

[56] References Cited

U.S. PATENT DOCUMENTS

| Re. 30,337 | 7/1980 | Loudas | 252/8.75 |
|---|---|---|---|
| 3,240,757 | 3/1966 | Sterling | 526/255 |
| 3,356,632 | 12/1967 | Zisman | 524/288 |
| 3,403,122 | 9/1968 | Sherman et al. | 260/29.6 |
| 3,462,296 | 8/1969 | Raynolds et al. | 117/161 |
| 3,484,281 | 12/1969 | Guenthner et al. | 117/121 |
| 3,816,167 | 6/1974 | Schultz et al. | 117/138.8 F |
| 3,870,748 | 3/1975 | Katsushima | 524/307 |
| 3,923,715 | 12/1975 | Dettre et al. | 260/29.6 R |
| 3,944,527 | 3/1976 | McCown | 260/79.7 |
| 3,950,298 | 4/1976 | McCown et al. | 260/33.6 F |
| 4,024,178 | 5/1977 | Landucci | 260/472 |
| 4,043,923 | 8/1977 | Loudas | 252/8.75 |
| 4,043,964 | 8/1977 | Sherman et al. | 260/29.6 F |
| 4,107,055 | 8/1978 | Sukornick et al. | 252/8.6 |
| 4,190,545 | 2/1980 | Marshall et al. | 252/8.75 |
| 4,215,205 | 7/1980 | Landucci | 525/331 |
| 4,264,484 | 4/1981 | Patel | 260/29.6 F |

FOREIGN PATENT DOCUMENTS 56-49081  5/1981  Japan .................................... 15/38

OTHER PUBLICATIONS

Banks, R. E., Ed., "Organofluorine Chemicals and their Industrial Applications," pp. 226-230 (Ellis Horwood, Ltd., West Sussex, England, 1979).
Saunders and Frisch, *Polyurethanes: Chemistry and Technology*, pp. 1, 2, 63, 64, 73, and 103-105 (Interscience Pub. Co., 1962).
*American Dyestuff Reporter*, Mar. 26, 1956, pp. 199-202.

*Primary Examiner*—Paul R. Michl
*Attorney, Agent, or Firm*—Donald M. Sell; James A. Smith; David R. Cleveland

[57] ABSTRACT

Textiles are rendered water and oil resistant by contacting them with a composition containing water-insoluble fluoroaliphatic radical- and aliphatic chlorine-containing ester and water-insoluble fluoroaliphatic radical-containing polymer.

14 Claims, No Drawings

TEXTILE TREATMENTS

TECHNICAL FIELD

This invention relates to textile treatments utilizing fluorochemical compositions and to the textiles so treated. In another aspect, it relates to such fluorochemical compositions and to their preparation.

BACKGROUND ART

In the industrial production of textiles (e.g., fibers and fabrics), it is common to treat the surface of the textile with a composition to impart added desirable properties thereto, such as oil and water repellency and resistance to soil (e.g., dry or oily soils). Fluorochemical compositions are commercially used for this purpose, and various patents and publications disclose a variety of such compositions, e.g., U.S. Pat. Nos. 3,462,296 (Raynolds et al.), 3,484,281 (Guenthner et al.), 3,816,167 (Schultz et al.), 3,944,527 (McCown), 4,024,178 (Landucci), 4,190,545 (Marshall et al.), and 4,215,205 (Landucci), Japanese published patent application (Kokai) No. 81-49081, and Banks, R.E., Ed., "Organofluorine Chemicals and their Industrial Applications," pages 226–230 (Ellis Horwood, Ltd., West Sussex, England, 1979). Also, various patents disclose carpet-treating compositions containing, inter alia, various fluorochemicals, e.g., U.S. Pat. Nos. 3,923,715 (Dettre et al.), 4,043,964 (Sherman et al.), 4,107,055 (Sukornick et al.), 4,264,484 (Patel), and Re 30,337 (Loudas).

Although the above-mentioned fluorochemical compositions are useful in textile treatment, and many are commercial products, some are ineffective under conditions imparting abrasive wear to the treated textile, some provide insufficient oil or water repellency on treated textiles, and some require high (and therefore economically undesirable) application rates to obtain sufficient oil or water repellency on treated textiles.

DISCLOSURE OF INVENTION

The present invention provides, in one aspect, fluorochemical compositions which impart a desirable combination of properties to textiles treated therewith, including retention of oil resistance when subjected to abrasion, good oil and water repellency, and low required application rates. The fluorochemical compositions of the present invention comprise a mixture of:
(a) water-insoluble fluoroaliphatic radical- and aliphatic chlorine-containing ester; and
(b) water-insoluble fluoroaliphatic radical-containing polymer.

The present invention also provides textiles (e.g., fabrics such as those used in upholstered furniture) treated with said compositions, and a method for applying said compositions to textiles to impart oil and water repellency thereto.

DETAILED DESCRIPTION

Said components (a) and (b) of the above mixture are each characterized as being normally non-rubbery, non-tacky, and normally solid, and preferably are free of ethylenic or acetylenic unsaturation. The term "water-insoluble," as used with respect to components (a) and (b), means that following application of the fluorochemical composition of the invention to the desired textile and drying thereof, the solubility in water of each component (a) and (b) is sufficiently low to prevent appreciable solubilization of the component (e.g., less than about 5 weight percent thereof) when subjected to water-based cleaning operations such as laundering and steam cleaning.

When it is desired that textiles treated with the above compositions be resistant to soiling under high compressive load, especially particulate soil, components (a) and (b) preferably each have at least one major transition temperature above about 25° C. "Major transition temperature," as used herein, is a crystalline melting point ($T_m$) or glass transition temperature ($T_g$) at which the composition becomes significantly softer as the temperature is raised. Ordinarily the major transition temperature can be detected by differential thermal analysis or thermomechanical analysis. While suitable compositions may have, for example, one or more glass transition temperatures at relatively low temperatures such as −25° C. to 0° C., the compositions preferably have at least one major transition temperature above about 25° C. In addition, it is preferred that textile treating compositions containing components (a) and (b) and other adjuvants be substantially free of non-volatile adjuvants not having a major transition temperature higher than about 25° C.

It is preferred that the carbon-bound fluorine content of the mixture of components (a) and (b) be at least 20 weight percent.

Said fluoroaliphatic radical- and aliphatic chlorine-containing esters (viz., component (a), above) of the fluorochemical compositions of this invention include simple esters and carbamate esters. Said simple esters can be prepared by reacting precursor fluoroaliphatic radical and aliphatic chlorine-containing alcohols with an organic acid such as a mono- or polycarboxylic acid. Said carbamate esters (commonly referred to as F"urethanes") can be prepared by reacting said alcohols, or said simple esters if they contain an isocyanate-reactive hydrogen atom, with an organic isocyanate. Said fluoroaliphatic radical- and aliphatic chlorine-containing esters are described in greater detail in U.S. Pat. No. 4,264,484 (Patel), and for that purpose the teachings thereof are incorporated herein by reference.

Said fluoroaliphatic radical- and aliphatic chlorine-containing esters are compounds which preferably are free of anionic groups and are non-ionic or cationic, and thus are compatible with cationic surfactants and can be used in textile treating compositions which are in the form of an aqueous emulsion, suspension or dispersion containing such surfactants, e.g., fluoroaliphatic surfactants such as $C_8F_{17}SO_2NHC_3H_6N^+(CH_3)_3Cl^-$.

The fluoroaliphatic radical of said esters, identified herein as "$R_f$," is a fluorinated, preferably saturated, monovalent, non-aromatic, aliphatic radical of at least three fully fluorinated carbon atoms. The chain of $R_f$ can be straight, branched, or if sufficiently large, cyclic, and can be interrupted by divalent oxygen atoms or trivalent nitrogen atoms bonded only to carbon atoms. A fully fluorinated $R_f$ radical is preferred, but hydrogen or chlorine atoms may be present as substituents in $R_f$ provided that not more than one atom of either is present in $R_f$ for every two carbon atoms, and that $R_f$ must at least contain a terminal perfluoromethyl group. Preferably, $R_f$ contains not more than 20 carbon atoms because such a large radical results in inefficient use of the fluorine content.

The term "aliphatic chlorine" refers to a chlorine atom bonded to a carbon atom whose other valences are satisfied by three other atoms, one of which is carbon and the other two of which are carbon or hydrogen.

Said fluoroaliphatic radical- and aliphatic chlorine-containing esters preferably have at least one major transition temperature greater than 25° C., more preferably greater than about 40° C., and most preferably greater than about 45° C. If desired, the compositions of the invention can contain mixtures of said esters. Said esters preferably contain at least 20 weight percent fluorine in the form of said $R_f$ radical and contain at least one aliphatic chlorine atom per molecule.

The precursor fluoroaliphatic radical- and aliphatic chlorine-containing alcohols (used to make said simple esters), hereafter referred to as "precursor alcohols", can be prepared, for example, by reaction of fluoroaliphatic radical-containing epoxide with hydrogen chloride to produce the corresponding precursor alcohol. The precursor alcohols preferably contain more than 20 wt.% of carbon-bonded fluorine, in the form of fluoroaliphatic radical, and at least one aliphatic chlorine. A preferred class of precursor alcohols can be represented by the formula:

$$R_f(Q)_m AOH \qquad \text{I}$$

where $R_f$ is as defined above,

Q is a divalent linking group free of epoxy-reactive and isocyanate-reactive groups, e.g., —CO—, —CONR—, —SO$_2$NR—, —SO$_2$—, —C$_n$H$_{2n}$—, —C$_6$H$_4$—, —C$_6$H$_3$Cl—, —OC$_2$H$_4$—, or combinations thereof, R is H or a C$_{1-6}$ alkyl radical, n is 1 to 20, m is zero or 1, and A is a divalent organic moiety having 2 to 30 carbon atoms, containing at least one aliphatic chlorine atom, and which is free of hydroxyl-reactive substituents.

The term "free of epoxy-reactive and isocyanate-reactive groups" means the absence of groups which would react with epoxides and isocyanates under the usual reaction conditions, e.g., below about 50° C.

An exemplification of the preparation of such precursor alcohols is set forth in Example 1 of U.S. Pat. No. 4,264,484.

The fluoroaliphatic radical-containing epoxides used in the preparation of the above preferred class of precursor alcohols can have one or more $R_f$ radicals and one or more epoxide or oxirane rings. Readily available epoxides are those corresponding to the formula:

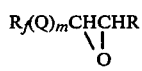
$$\qquad \text{II}$$

where $R_f$, Q and m are as defined above and where the epoxide contains at least about 20 wt.% carbon-bonded fluorine in the form of said $R_f$ radical.

When the epoxides of Formula II above are reacted with hydrogen chloride, the major precursor alcohol products correspond to the formula:

$$R_f(Q)_m CH(OH)CHRCl \qquad \text{III}$$

where $R_f$, Q, R, and m are as defined above.

Another method of preparing precursor alcohols is by reaction of epichlorohydrin with a fluoroaliphatic radical-containing alcohol. Readily available fluoroaliphatic radical-containing alcohols which can be used in this preparation are those corresponding to the formula:

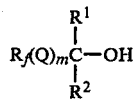
$$\qquad \text{IV}$$

where $R_f$, Q and m are as defined above, $R^1$ is hydrogen, a C$_{1-6}$ alkyl radical, or a C$_{1-6}$ haloalkyl radical, $R^2$ is hydrogen, a C$_{1-6}$ alkyl radical, a C$_{1-6}$ haloalkyl radical, or a C$_{1-6}$ aryl radical, and $R^1$ and $R^2$ can be connected together to form an aromatic or cycloaliphatic structure that includes the hydroxylbearing carbon atom shown in Formula IV. When epichlorohydrin is reacted with said fluoroaliphatic radical-containing alcohols to form precursor alcohols, the latter correspond to the formula:

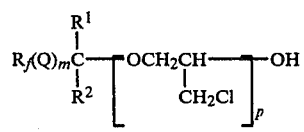
$$\qquad \text{V}$$

where $R_f$, Q, $R^1$, and $R^2$ are as defined above and p is a number which is greater than zero and less than 10. Preferably, p is between 1 and 5. Precursor alcohols of Formula V constitute a preferred subclass of the precursor alcohols of Formula I. Representative fluoroaliphatic radical-containing alcohols which can be reacted with epichlorohydrin to prepare precursor alcohols of Formula V are those disclosed, for example, in columns 5 and 6 of U.S. Pat. No. 3,484,281 and in columns 3 and 4 of U.S. Pat. No. 4,043,923 (Loudas).

The aforementioned simple esters can be prepared by conventional esterification techniques through reaction of the various above-described precursor alcohols with mono- or polycarboxylic acids (or anhydrides thereof). Said mono- and polycarboxylic acids and acid anhydrides (and said esterification techniques) are disclosed in said U.S. Pat. No. 4,264,484 and include acetic acid, deltachlorovaleric acid, octanoic acid, decanoic acid, lauric acid, palmitic acid, oleic acid, linoleic acid, malonic acid, benzylmalonic acid, succinic acid, hydroxysuccinic acid, adipic acid, suberic acid, azelaic acid, sebacic acid, dodecanedioic acid, tridecanedioic acid, maleic acid, dibromomaleic anhydride, dichloromaleic anhydride, itaconic acid, d,l-camphoric acid, phthalic acid, phthalic anhydride, citric acid, and trimesic acid. Esters of adipic acid (i.e., adipates) and of phthalic acid (i.e., phthalates) are preferred simple esters for use in the present invention. Particularly preferred simple esters are prepared by reacting adipic acid with the reaction product of epichlorohydrin and the fluoroaliphatic radical-containing alcohol C$_8$F$_{17}$SO$_2$N(CH$_3$)C$_2$H$_4$OH, following the procedure of Example 8 of said U.S. Pat. No. 4,264,484. The resulting simple ester has the formula:

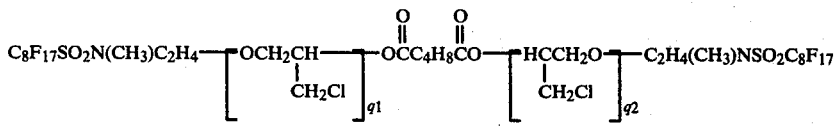

VI where q₁+q₂ is 1 or more.

When the fluoroaliphatic radical- and aliphatic chlorine-containing esters of this invention are said carbamate esters, they can be prepared by conventional urethane bond-forming reactions such as those disclosed in U.S. Pat. No. 3,923,715 and Saunders and Frisch, *Polyurethanes: Chemistry and Technology*, pp. 1, 2, 63, 64, 73, and 103–105 (Interscience Pub. Co., 1962). Said carbamate esters are most readily prepared by reaction of said precursor alcohols, or said simple esters if the latter contain an isocyanate-reactive hydrogen atom (such isocyanate-reactive simple esters will be referred to hereafter as "reactive simple esters") with an organic isocyanate such as 2,4-tolylene diisocyanate. Other aromatic, aliphatic, or alicyclic isocyanates can be substituted for 2,4-tolylene diisocyanate on an isocyanate-equivalent basis, such as 2,6-tolylene diisocyanate, isophorone diisocyanate, hexamethylene diisocyanate, hexamethylene diisocyanate trimer (e.g., that sold as "Desmodur N-100," having the formula OCNC₆H₁₂N(CONHC₆H₁₂NCO)₂), and mixtures thereof. A particularly effective mixture of isocyanates is one containing isophorone diisocyanate and 2,4-tolylene diisocyanate in ratios of 10:1 to 1:10, e.g., 1:3. When mixtures of isocyanates are used, the component isocyanates of the mixture can be reacted sequentially with the precursor alcohol or with the reactive simple ester, or the mixture of isocyanates as such can be reacted therewith. A single precursor alcohol or reactive simple ester can be reacted with the isocyanate(s), or mixtures of precursor alcohols, reactive simple esters, or precursor alcohol and reactive simple ester can be reacted with the isocyanate(s). The reaction mixture can also contain alcohols free of fluoroaliphatic radicals or free of aliphatic chlorine atoms, or free of both fluoroaliphatic radicals and aliphatic chlorine atoms. It is preferred that the precursor alcohols and reactive simple esters be free of aliphatic unsaturation, although aromatic substituents can be present provided the alcoholic hydroxyl group is bonded to an aliphatic carbon atom.

A preferred class of carbamate esters useful in this invention can be represented by the formula:

$$R^3(NHCOOB)_r \qquad \text{VII}$$

where R³ is the isocyanate-free residue of an organic polyisocyanate, B is the hydroxyl-free residue of one or more of the above-described precursor alcohols, and r is an integer equal to the number of isocyanate groups in said polyisocyanate, e.g. 2 to 5.

Where mixtures of isocyanates or mixtures of precursor alcohols are used to prepare the carbamate esters of Formula VII, R³ and B will each represent more than one species.

The fluoroaliphatic radical-containing polymers (viz., component (b), above) of the fluorochemical compositions of this invention include addition and condensation polymers. As used herein, "polymers" refers to linear or branched organic materials having a multiplicity of repeating units and a molecular weight of about 5000 or more.

Some of said fluoroaliphatic radical-containing polymers are described in greater detail in U.S. Pat. No. 4,043,964 (Sherman et al.), and for that purpose the teachings thereof are incorporated herein by reference.

The fluoroaliphatic radical-containing polymers preferably have at least one major transition temperature greater than 25° C., more preferably greater than about 40° C., and most preferably greater than about 45° C. If desired, the compositions of the invention can contain mixtures of said polymers.

The fluoroaliphatic radical-containing polymers can be prepared by polymerizing one or more monomers having the formula:

$$R_f P \qquad \text{VIII}$$

where
$R_f$ is a fluorinated, preferably saturated, monovalent, non-aromatic, aliphatic radical of at least three fully fluorinated carbon atoms; and
P is a polymerizable group.

The chain of $R_f$ can be straight, branched, or if sufficiently large, cyclic, and can be interrupted by divalent oxygen atoms or trivalent nitrogen atoms bonded only to carbon atoms. A fully fluorinated $R_f$ radical is preferred, but hydrogen or chlorine atoms may be present as substituents in $R_f$ provided that not more than one atom of either is present in $R_f$ for every two carbon atoms, and that $R_f$ must at least contain a terminal perfluoromethyl group. Preferably, $R_f$ contains not more than 20 carbon atoms because such a large radical results in inefficient use of the fluorine content.

The polymerizable group P preferably is an ethylenically unsaturated moiety which is polymerizable by free radical initiation, electron irradiation, ionic initiation, or the like. P can also be a radical of a dicarboxylic acid, glycol, diamine hydroxide, and the like which is copolymerizable with a radical of an appropriate comonomer selected, for example, from organic diisocyanates, diaryl halides, and the like, or other combinations apparent to those skilled in the art.

$R_f P$ preferably contains at least about 20 weight percent carbon-bound fluorine.

Preferably, $R_f P$ is a fluoroaliphatic acrylate or methacrylate monomer. Examples of suitable fluoroaliphatic acrylate and methacrylate monomers include:

$C_8F_{17}SO_2N(CH_3)CH_2CH_2OOCCH=CH_2$, $C_6F_{13}C_2H_4OOCC(CH_3)=CH_2$, $C_6F_{13}C_2H_4SC_2H_4OOCCH=CH_2$, $C_8F_{17}C_2H_4OOCC(CH_3)=CH_2$ $C_8F_{17}C_2H_4N(CH_3)C_2H_4OOCC(CH_3)=CH_2$, $C_2F_5C_6F_{10}CH_2OOCCH=CH_2$, $C_7F_{15}CH_2OOCCH=CH_2$, $C_7F_{15}CON(CH_3)C_2H_4OOCCH=CH_2$, $(CF_3)_2CF(CF_2)_6CH_2CH(OH)CH_2OOCCH=CH_2$,

-continued $(CF_3)_2CFOC_2F_4C_2H_4OOCCH=CH_2$, $C_8F_{17}C_2H_4SO_2N(C_3H_7)C_2H_4OOCCH=CH_2$, $C_7F_{15}C_2H_4CONHC_4H_8OOCCH=CH_2$, $C_3F_7(CFCF_2O)_2CFCH_2OOCCH=CH_2$,
$\quad\quad\ \ |\quad\quad\quad |$
$\quad\quad\ \ CF_3\quad\quad\ CF_3$ $C_7F_{15}COOCH_2C(CH_3)_2CH_2OOCC(CH_3)=CH_2$, $C_8F_{17}SO_2N(C_2H_5)C_4H_8OOCCH=CH_2$, $(C_3F_7)_2C_6H_3SO_2N(CH_3)_2C_2H_4OOCCH=CH_2$.

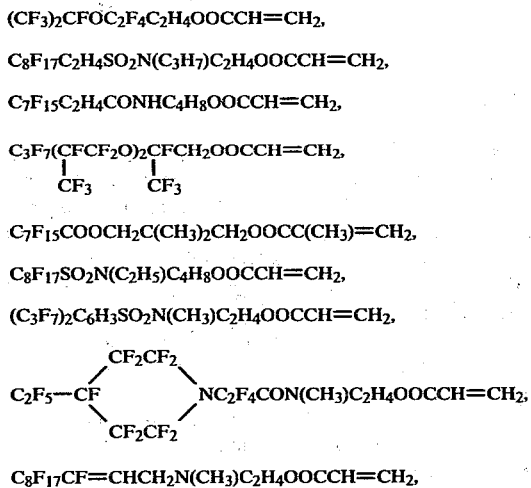

$C_8F_{17}CF=CHCH_2N(CH_3)C_2H_4OOCCH=CH_2$, and mixtures thereof.

Other compatible comonomers can be copolymerized with the preferred fluoroaliphatic acrylate or methacrylate $R_f/P$ monomers to form fluoroaliphatic radical-containing polymers for use in this invention. Examples of such comonomers include vinyl chloride, vinylidene chloride, acrylonitrile, styrene, N-alkylacrylamides, and alkyl and epoxy alkyl esters of ethylenically unsaturated acids such as acrylic acid, methacrylic acid, and chloroacrylic acid, as well as mixtures thereof.

The fluoroaliphatic radical-containing polymers obtained by polymerization of said $R_f/P$ monomers can be random, alternating, or segmented polymers. Polymers prepared from the preferred fluoroaliphatic acrylate or methacrylate $R_f/P$ monomers can be made as aqueous dispersions (e.g., by following the general procedure of Example 6 of U.S. Pat. No. 3,403,122 or Example 3 of U.S. Pat. No. 4,024,178) or can be made in solvent (e.g., by following the general procedure of Example 2 of U.S. Pat. No. 4,043,964). Polymers prepared from other $R_f/P$ monomers can be prepared using methods familiar to those skilled in the art.

Fluoroaliphatic radical-containing polymers for use in this invention can be obtained by means other than polymerization of $R_f/P$ monomers. For example, functional fluoroaliphatic compounds can be reacted with preformed polymers, e.g., by the addition of fluoroaliphatic thiols across some of the double bonds of an unsaturated polymer such as an acrylonitrile-butadiene-styrene polymer. However, these other routes to fluoroaliphatic radical-containing polymers are generally less convenient than polymerization of $R_f/P$ monomers.

The fluorochemical compositions of this invention (viz., the mixture of components (a) and (b), above) can be applied to articles such as textile fabrics, non-woven webs, single fibers, carpets, and the like made of natural materials such as wool, cotton, cellulose, and leather or of synthetic materials such as nylon, acrylics, olefins, polyesters, blends, and the like. The compositions of the invention are especially useful on velvet fabrics, as they do not detract from their "hand," and on acrylic and olefin fabrics, which are difficult to treat effectively using prior art textile treatments. For example, treatment of olefin fabrics with some prior art textile treating compositions has required coapplication of a melamine resin to obtain effective water resistance. Such melamine resins are undesirable as they liberate formaldehyde during cure.

The compositions of the invention ordinarily are applied as aqueous emulsions or dispersions (preferably as cationic emulsions) or as solutions in non-aqueous solvents.

The fluorochemical compositions of the invention can also contain other adjuvants. It will frequently be desirable to add to the compositions of the invention fluoroaliphatic radical-containing carbonylimino compounds, such as those described in U.S. Pat. No. 3,484,281, or fluoroaliphatic radical-containing imine compounds, such as those described in U.S. Pat. Nos. 4,024,178 and 4,215,205, in order to modify properties of textiles treated therewith. Fluorochemical compositions containing such carbonylimino or imine compounds are described in the copending application of C. L. Steel entitled "Textile Treatments," Ser. No. 345,409, filed even date herewith now U.S. Pat. No. 4,401,780. The disclosure of said copending application is incorporated herein by reference.

Crease-resistant resins, exhaustion aids, antistatic agents, drying aids, and the like can be included in compositions of the invention. Fugitive wetting agents (e.g., isopropyl or isobutyl alcohol, or non-rewetting surfactants) can be used when necessary to provide thorough wetting and penetration of the textile. When alcohols are used as wetting agents, they preferably are thoroughly dissolved and diluted before any other bath components are added. Alcohols preferably are not added directly to baths containing fluorochemical compositions of the invention, as immediate flocculation may occur. If the compositions of the invention are applied in the form of aqueous emulsions, a suitable nonionic or cationic emulsifier should be added thereto. Silicone waxes and oils preferably are not added to the compositions of the invention, as such silicone products may adversely affect the performance of treated textiles.

The weight ratio of the component (a) to component (b) can vary over a broad range, and will be selected to provide the desired balance of oil and water resistance on the textile which is desired to be treated. In general, as the amount of component (a) is increased, oil resistance (initial resistance and resistance after abrasion) increases, and as the amount of component (b) is increased, water resistance increases. The weight ratio of component (a) to component (b) in the compositions of the invention preferably ranges between about 1:10 to 10:1. In order to obtain an optimum balance of properties, weight ratios of (a) to (b) between 1:1 and 3:1 (most preferably about 2:1) are preferred for aqueous emulsions or dispersions, and weight ratios between 0.5:1 and 2:1 (most preferably about 1:1) are preferred for non-aqueous solutions. The total amount of components (a) and (b) in such compositions will depend on the amount of the composition of the invention to be applied during treatment. This will, in turn, depend on the structure and composition of the textile to be treated as well as the application and drying facilities which are used. Laboratory evaluation will often be a good indicator of compatability and performance in mill runs.

Application of the compositions of the invention can be by customary procedures such as spraying, padding, exhaustion, foam application, roll-coating, and the like. The fabric to be treated and the mixing and processing equipment preferably are free of silicone contamination.

Bath temperatures of 16° to 38° C. (60° to 100° F.) are preferred. Components (a) and (b) of the compositions of the invention can be coapplied, or, if desired, can be applied sequentially. Drying of the treated textile can be by customary procedures such as heat ovens or air-drying. Typically, the treated textile is heated to about 100° C. or more for 3 to 5 minutes or more to thoroughly dry the composition. It is desirable to lay treated fabrics horizontal during drying to provide consistent properties. Aging of the treated textile after drying will sometimes improve properties. Wet pick-up levels of 35 to 70 percent are suggested. Generally a total application of compositions of the invention sufficient to provide the desired improvement in oil and water resistance should be used, e.g., about 0.01 to about 5 percent dry solids on fiber (SOF), with application levels of about 0.3 percent solids on fiber being preferred at wet pick-up levels of 50 to 60 percent. Where wet pick-up is less than 50 percent or more than 60 percent, the amount of fluorochemical composition applied should be adjusted accordingly.

Textiles treated with the compositions of this invention have thereon a long-lasting, oil- and water-resistant coating which will remain effective even after repeated cleaning and which will survive severe abrasion. If preferred compositions in which components (a) and (b) have major transition temperatures above about 25° C. are employed, then textiles treated therewith will also have good soil resistance. The useful properties of textiles treated with compositions of the invention can be evaluated using a series of measurements described in the following paragraphs.

The water repellency of treated fabrics is measured by Standard Test Number 22, published in the 1977 Technical Manual and Yearbook of the American Association of Textile Chemists and Colorists (AATCC), and is expressed in terms of the "spray rating" of the tested fabric. The spray rating is measured using a 0 to 100 scale where 100 is the highest possible rating. In general, a spray rating of 70 or greater is desirable, particularly for outerwear fabrics.

The oil repellency of treated fabrics is measured by AATCC Standard Test 118-1978, which test is based on the resistance of treated fabric to penetration by oils of varying surface tensions. Treated fabrics resistant only to "Nujol", a brand of mineral oil, and the least penetrating of the test oils, are given a rating of 1, whereas treated fabrics resistant to heptane, the most penetrating of the test oils, are given a value of 8. Other intermediate values are determined by use of other pure oils or mixtures of oils. The rated oil repellency corresponds to the most penetrating oil (or mixture of oils) which does not penetrate or wet the fabric after 30 seconds contact. In some cases, ratings in one-half point increments were assigned where slight wetting of the fabric occurred but no penetration was observed. Higher numbers indicate better oil repellency. In general, an oil repellency of 4 or greater is desirable.

The oil repellency of tested fabrics after abrasion is measured by abrading 5 cm × 12.5 cm samples of fabric (the long dimension is the warp direction) using 40 back-and-forth rubs over a 20 second period with No. 600 abrasive paper ("WETORDRY TRI-M-ITE," commercially available from 3M Co.) in an AATCC crockmeter. The abovedescribed AATCC oil repellency Test 118-1978 is performed on the abraded samples and the oil repellency rating recorded. In general, an oil repellency after abrasion of 3 or greater is desirable.

The aqueous stain repellency of treated samples is measured using a water/isopropyl alcohol test, and is expressed in terms of the "WATER/IPA" rating of the treated fabric. Treated fabrics which are penetrated by or resistant only to a 100% water/0% isopropyl alcohol mixture, the least penetrating of the test mixtures, are given a rating of 100/0, whereas treated fabrics resistant to a 0% water/100% isopropyl alcohol mixture, the most penetrating of the test mixtures, are given a rating of 0/100. Other intermediate values are determined by use of other water/isopropyl alcohol mixtures, in which the percentage amounts of water and isopropyl alcohol are each multiples of 10. The WATER/IPA rating corresponds to the most penetrating mixture which does not penetrate or wet the fabric after 15 seconds contact. In general, a WATER/IPA rating of <50/>50 is desirable.

The resistance to dry soiling of treated fabrics is measured by placing twenty 7.5 cm × 10 cm samples of fabric (the long dimension is the warp dimension) in a pre-seasoned polyethylene bag containing 14 grams of standard synthetic dry soil (see *American Dyestuff Reporter*, Mar. 26, 1956, page 199). The bag and its contents are shaken vigorously for 30 seconds. Each of the fabric samples is then placed on a 7.5 cm × 10 cm mesh screen sample holder, and soil is removed from the samples by applying a vacuum to the backside of the sample holder and by blowing soil off the topside of the fabric sample using compressed air. The fabric sample is turned over on the sample holder and the soil removal process is repeated. The dry soil resistance of the fabric sample is measured by visual comparison with an unsoiled sample, and rated from 1 to 5 with a 5 rating corresponding to no observable soiling of the fabric sample. In general, a dry soil rating of 3 or greater is desirable.

The laundering cycle employed in some of the examples is as follows: The treated fabrics were laundered 5 times in a mechanically agitated automatic washing machine capable of containing a 4 kg. load, using water at 50° C. and a commercial detergent, and then tumble-dried in an automatic dryer for 40 minutes at about 70° C. before being tested. The laundered fabrics were not ironed after drying.

The following examples are offered to aid understanding of the present invention and not to be construed as limiting the scope thereof. Where parts are given, they are parts by weight.

EXAMPLES 1–32 AND

COMPARATIVE EXAMPLES 1–25

Fluorochemical compositions of this invention (and comparative compositions not of this invention) were applied to dry fabric at various wet pick-up levels. Treated fabrics were dried for 10 minutes, except for the fabrics of Example Nos. 21 and 22 and Comparative Example Nos. 20–23, which were dried for 3 minutes, and the fabrics of Example Nos. 25–32, which were dried for 5 minutes. Treated olefin fabrics were dried at 120° C. All other fabrics were dried at 150° C.

Set out below in Table I are the Example No. or Comparative Example No., identity and weight percent of the fluoroaliphatic-radical and aliphatic chlorine-containing ester (identified as component "(a)") in the solid portion of the composition, identity and weight percent of the fluoroaliphatic radical-containing polymer (identified as component "(b)") in the solid portion of the composition, application method (identified as "App."), type of treated fabric, percent solids applied to the fabric (identified as "%SOF"), and test rating results for spray rating (identified as "SR"), oil repellency (identified as "OR"), oil repellency after abrasion (identified as "OR-ABR"), aqueous stain repellency (identified as "WATER/IPA"), and resistance to dry soiling (identified as "DS"). Many of the entries in Table I are abbreviated. The abbreviations are explained in notes following the body of Table I.

TABLE I

| Example No. or Comparative Example No. | Component (a) Identity | Component (a) Wt. % | Component (b) Identity | Component (b) Wt. % | App. | Fabric | % SOF | SR | OR | OR-ABR | WATER/IPA | DS |
|---|---|---|---|---|---|---|---|---|---|---|---|---|
| 1 | A1 | 67 | B1 | 33 | ES | OF | 0.3 | 70 | 5.5 | 4 | 0/100 | |
| 2 | A1 | 67 | B1 | 33 | ES | CV | 0.3 | 70 | 5 | 4.5 | | |
| 3 | A1 | 67 | B1 | 33 | ES | RCV | 0.3 | 50 | 5.5 | 4 | | |
| 4 | A2 | 9 | B2 | 91 | EP | OF | 0.3 | 50 | 3.5 | 0 | 30/70 | |
| 5 | A2 | 20 | B2 | 80 | EP | OF | 0.3 | 70 | 4.5 | 1.5 | 20/80 | |
| 6 | A2 | 33 | B2 | 67 | EP | OF | 0.3 | 70 | 4 | 2 | 30/70 | |
| 7 | A2 | 67 | B3 | 33 | SS | OF | 0.2 | 70 | 4.5 | 4 | 30/70 | |
| 8 | A2 | 50 | B2 | 50 | EP | OF | 0.3 | 80 | 6 | 4.5 | 0/100 | |
| 9 | A2 | 67 | B2 | 33 | ES | OF | 0.3 | 70 | 5.5 | 4.5 | 30/70 | |
| 10 | A2 | 67 | B2 | 33 | EP | OF | 0.3 | 70 | 5.5 | 5 | 30/70 | |
| 11 | A2 | 67 | B2 | 33 | ES | OV | 0.3 | 70 | 5.5 | 4 | | |
| 12 | A2 | 67 | B2 | 33 | ES | CV | 0.3 | 70 | 4.5 | 2 | | |
| 13 | A2 | 67 | B2 | 33 | ES | RCV | 0.3 | 70 | 5.5 | 4.5 | | |
| 14 | A2 | 80 | B2 | 20 | EP | OF | 0.3 | 70 | 5 | 5 | 30/70 | |
| 15 | A2 | 91 | B2 | 9 | EP | OF | 0.3 | 50 | 5.5 | 5 | 30/70 | |
| 16 | A3 | 67 | B3 | 33 | SS | OF | 0.2 | 60 | 4 | 5 | 30/70 | |
| 17 | A4 | 67 | B3 | 33 | SS | OF | 0.2 | 70 | 4 | 3 | 30/70 | |
| 18 | A5 | 67 | B3 | 33 | SS | OF | 0.2 | 70 | 4.5 | 4.5 | 30/70 | |
| 19 | A2 | 67 | B4 | 33 | SS | OF | 0.1 | 70 | 5.5 | 5 | | |
| 20 | A2 | 67 | B5 | 33 | SS | CV | 0.2 | 50 | 5.5 | 4 | | |
| 21 | A6 | 67 | B4 | 33 | SS | OF | 0.2 | 80 | 5 | 5.5 | 30/70 | |
| 22 | A6 | 67 | B4 | 33 | SS | CV | 0.2 | 80 | 5 | 4 | 30/70 | 4.5 |
| 23 | A2 | 50 | B3 | 50 | SS | RV | 0.1 | 50 | 5 | 5 | 30/70 | 4 |
| 24 | A2 | 50 | B3 | 50 | SS | OF | 0.1 | 70 | 4.5 | 3 | 30/70 | |
| 25 | A7 | 50 | B6 | 50 | EP | NT | 0.2 | 100 | 7 | | | |
| 26 | A7 | 50 | B6 | 50 | EP | PCF | 0.2 | 80 | 4 | | | |
| 27 | A7 | 50 | B6 | 50 | EP | PWF | 0.2 | 75 | 5 | | | |
| 28 | A7 | 50 | B6 | 50 | EP | PKF | 0.2 | 70 | 5 | | | |
| 29 | A7 | 33 | B6 | 67 | EP | NT | 0.2 | 80 | 5.5 | | | |
| 30 | A7 | 33 | B6 | 67 | EP | PCF | 0.2 | 100 | 5 | | | |
| 31 | A7 | 33 | B6 | 67 | EP | PWF | 0.2 | 100 | 6 | | | |
| 32 | A7 | 33 | B6 | 67 | EPKF | PFK | 0.2 | 100 | 6 | | | |
| Comp. Ex. 1 | — | — | — | — | — | OF | — | 0 | 0 | 0 | 100/0 | |
| Comp. Ex. 2 | — | — | — | — | — | OV | — | 0 | 0 | 0 | 100/0 | |
| Comp. Ex. 3 | — | — | — | — | — | CV | — | 0 | 0 | 0 | 100/0 | 3 |
| Comp. Ex. 4 | — | — | — | — | — | RCV | — | 0 | 0 | 0 | 100/0 | |
| Comp. Ex. 5 | — | — | B1 | 100 | ES | OF | 0.3 | 75 | 5 | 1.5 | | |
| Comp. Ex. 6 | — | — | B1 | 100 | ES | CV | 0.3 | 70 | 3 | 1 | | |
| Comp. Ex. 7 | — | — | B1 | 100 | ES | RCV | 0.3 | 0 | 2 | 0 | | |
| Comp. Ex. 8 | — | — | B2 | 100 | EP | OF | 0.3 | 50 | 3 | 0 | 30/70 | |
| Comp. Ex. 9 | — | — | B2 | 100 | ES | OF | 0.3 | 60 | 1 | 0 | 80/20 | |
| Comp. Ex. 10 | — | — | B2 | 100 | ES | OV | 0.3 | 60 | 2 | 1 | 60/40 | |
| Comp. Ex. 11 | — | — | B2 | 100 | ES | CV | 0.3 | 80 | 4.5 | 2 | | |
| Comp. Ex. 12 | — | — | B2 | 100 | ES | RCV | 0.3 | 70 | 2.5 | 1 | | |
| Comp. Ex. 13 | A2 | 100 | — | — | EP | OF | 0.3 | 0 | 5 | 4 | 50/50 | |
| Comp. Ex. 14 | A2 | 100 | — | — | ES | OF | 0.3 | 50 | 4 | 3 | 60/40 | |
| Comp. Ex. 15 | A2 | 100 | — | — | ES | CV | 0.3 | 60 | 5 | 3 | | |
| Comp. Ex. 16 | A2 | 100 | — | — | ES | RCV | 0.3 | 50 | 5.5 | 4 | | |
| Comp. Ex. 17 | — | — | B4 | 100 | SS | OF | 0.1 | 70 | 5 | 1 | | |
| Comp. Ex. 18 | A2 | 100 | — | — | SS | OF | 0.1 | 70 | 4 | 3 | | |
| Comp. Ex. 19 | — | — | B5 | 100 | SS | CV | 0.2 | 70 | 3 | 0 | | |
| Comp. Ex. 20 | — | — | B4 | 100 | SS | OF | 0.2 | 70 | 5 | 0 | 20/80 | |
| Comp. Ex. 21 | — | — | B4 | 100 | SS | CV | 0.2 | 70 | 4.5 | 3 | 30/70 | 4 |
| Comp. Ex. 22 | A6 | 100 | — | — | SS | OF | 0.2 | 70 | 4.5 | 4.5 | 30/70 | |
| Comp. Ex. 23 | A6 | 100 | — | — | SS | CV | 0.2 | 50 | 4 | 2.5 | 30/70 | 4 |
| Comp. Ex. 24 | — | — | B3 | 100 | SS | RV | 0.1 | 0 | 3.5 | 1.5 | 100/0 | |

TABLE I-continued

| Example No. or Comparative Example No. | Component (a) Identity | Wt. % | Component (b) Identity | Wt. % | App. | Fabric | % SOF | SR | OR | OR-ABR | WATER/IPA | DS |
|---|---|---|---|---|---|---|---|---|---|---|---|---|
| Comp. Ex. 25 | — | — | B3 | 100 | SS | OF | 0.1 | 75 | 3 | 1 | 30/70 | |

NOTES TO ENTRIES IN TABLE 1
Component (a):

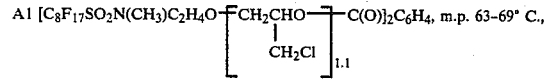
A1 $[C_8F_{17}SO_2N(CH_3)C_2H_4O\text{-}[CH_2CHO(CH_2Cl)]_{1.1}\text{-}C(O)]_2C_6H_4$, m.p. 63–69° C., prepared from the alcohol $C_8F_{17}SO_2N(CH_3)C_2H_4O\text{-}[CH_2CHO(CH_2Cl)]_{1.1}\text{-}H$ (hereafter "alcohol I") and phthalic anhydride following the general procedure of Example 8 of U.S. Pat. No. 4,264,484.

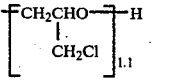
A2 $[C_8F_{17}SO_2N(CH_3)C_2H_4O\text{-}[CH_2CHO(CH_2Cl)]_{1.1}\text{-}C(O)]_2C_4H_8$, prepared from alcohol I and adipic acid following the procedure used for A1.

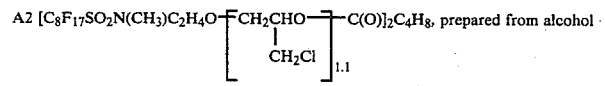
A3 $[C_8F_{17}SO_2N(CH_3)C_2H_4O\text{-}[CH_2CHO(CH_2Cl)]_2\text{-}C(O)]_2C_4H_8$, m.p. 45–57° C., prepared from the alcohol $[C_8F_{17}SO_2N(CH_3)C_2H_4O\text{-}[CH_2CHO(CH_2Cl)]_2\text{-}H$, following the procedure used for A2.

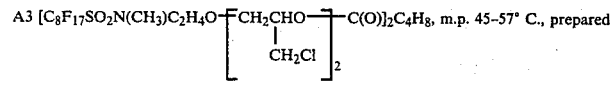
A4 $[C_8F_{17}SO_2N(CH_3)C_2H_4O\text{-}[CH_2CHO(CH_2Cl)]_{8.5}\text{-}C(O)]_2C_4H_8$, prepared from the alcohol $C_8F_{17}SO_2N(CH_3)C_2H_4O\text{-}[CH_2CHO(CH_2Cl)]_{8.5}\text{-}H$, following the procedure used for A2.

A5 $[C_8F_{17}SO_2N(CH_3)CH_2CH(CH_2Cl)OC(O)]_2C_4H_8$, m.p. 66–69° C., prepared from the alcohol $C_8F_{17}SO_2N(CH_3)CH_2CH(CH_2Cl)OH$, following the procedure used for A2.

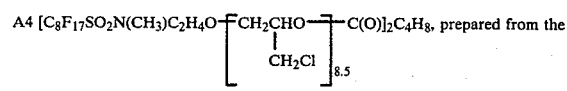
A6 $[C_8F_{17}SO_2N(CH_3)C_2H_4O\text{-}[CH_2CHO(CH_2Cl)]_{1.1}\text{-}CONH]_2C_6H_3CH_3$, prepared from alcohol I and 2,4-toluene diisocyanate following the general procedure of Example 4 of U.S. Pat. No. 4,264,484.

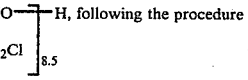
A7 $[C_8F_{17}SO_2N(CH_3)C_2H_4O\text{-}[CH_2CHO(CH_2Cl)]_{1.1}\text{-}C(O)]_3C_3H_4OH$, prepared from alcohol I and citric acid following the general procedure of Example 3 of U.S. Pat. No. 4,264,484.

Component (b):
B1 70/20/10 Copolymer of $C_8F_{17}SO_2N(CH_3)C_2H_4OOCCH=CH_2/CH_2=C(CH_3)COO(C_4H_8O)_{27}OOCC(CH_3)=CH_2/C_4H_9OOCCH=CH_2$, prepared by solution and emulsion polymerization following the general procedures of Examples 1 and 12 of U.S. Pat. No. 3,950,298.
B2 "Teflon G" copolymer, commercially available from E. I. du Pont de Nemours and Co., believed to be a 50/50 copolymer of $C_8F_{17}C_2H_4OOCC(CH_3)=CH_2/C_{12}H_{25}OOCC(CH_3)=CH_2$, prepared by emulsion polymerization following the general procedure of Example 3 of U.S. Pat. No. 4,024,178.
B3 57/28/15 Copolymer of $C_8F_{17}SO_2N(CH_3)C_2H_4OOCCH=CH_2/C_8F_{17}SO_2N(C_2H_5)C_2H_4OOCNHC_6H_3(CH_3)NHOOCCH(CH_3)CH_2OOCC(CH_3)=CH_2/C_4H_9OOCCH=CH_2$, prepared following the procedure used for B2.
B4 45/45/10 Copolymer of $C_8F_{17}SO_2N(CH_3)C_{11}H_{22}OOCCH=CH_2/C_8F_{17}SO_2N(CH_3)C_{11}H_{22}OOCC(CH_3)=CH_2$/glycidyl methacrylate, prepared following the solution polymerization procedure used for B1, with trichloroethylene as solvent.
B5 65/35 Copolymer of $C_8F_{17}SO_2N(CH_3)C_2H_4OOCCH=CH_2/C_{18}H_{37}OOCC(CH_3)=CH_2$, prepared following the procedure used for B2.
B6 95/5 Copolymer of $C_8F_{17}SO_2N(CH_3)C_2H_4OOCCH=CH_2/C_4H_9OOCCH=CH_2$, prepared following the general procedure used for B2.
Application:
ES Aqueous emulsion applied by spraying. Emulsions were prepared following the general procedure of Example 8 of U.S. Pat. No. 4,264,484, using as emulsifiers, per 100 parts of fluorochemical composition solids, 3.75 parts of polyethoxylated sorbitan monooleate ("Tween 80", commercially available from ICI, Ltd.) and 1.25 parts of $C_8F_{17}SO_2NHC_3H_6N^+(CH_3)_3Cl^-$. Compositions containing component A2 contained, as part of the fluorochemical solids of component A2, 10.6 parts of an additional emulsifier prepared by copolymerizing $C_8F_{17}SO_2N(CH_3)C_2H_4OOCCH=CH_2$ and the methacrylate ester of a 4000 M.W. polyoxyethylene glycol. The emulsions initially contained 30% fluorochemical solids, 8% ethylene glycol, and <1% ethyl acetate in deionized water, and then were diluted for use to an emulsion containing 0.6 weight percent solid fluorochemical composition. Spraying was carried out using airless spray equipment, at a 50 percent wet pick-up level.
EP Aqueous emulsion (prepared as described above for ES application) applied using a pad bath, at various wet pick-up levels depending upon the test fabric.
SS Non-aqueous solution (in 1,1,1-trichloroethane) applied by spraying (as described above for ES application) from a solution containing 0.4 weight % solids, at a 50 percent wet pick-up level.
Fabric:
OF Olefon flat (a green-colored, back-coated polypropylene fabric commercially available from Quaker Fabric Co. under the style name "Bluehill").
OV Olefin velvet (a fawn-colored, woven polypropylene fabric commercially available from Joan Fabrics Corp. under the style name "Davis", style no. 62132, color no. 04577).
CV Cotton velvet (a fawn-colored fabric commercially available from Joan Fabrics Corp. under the style name "Rivalto").
RCV 79/21 Rayon/cotton velvet (a coral-colored fabric commercially available from Joan Fabrics Corp. under the style name "Regal").
RV Rayon velvet (a green-colored fabric commercially available from Collins & Aikman Corp. under the style name "Royal", Pattern no. 1F-328).
NT Nylon taffeta (an orange-colored fabric commercially available from West Point-Pepperell, Inc. under the style name "Norseman", style no. 76-703).
PCF 65/35 Polyester/cotton flat (a greyish tan-colored fabric commercially available from Klopman Mills Blended Fabrics Division of Burlington Industries, Inc. under the style name "Landslide").
PWF Polyester woven flat (a dark brown-colored fabric commercially available from Klopman Mills Textured Wovens Division of Burlington Industries, Inc. under the style name "Seville", style number 00622016, shade number 7241-00).
PKF Polyester knit flat (a coral-colored fabric commercially available from Texfi Industries, Inc. under the style number 1418, color number 3402).

The "hand" and luster of fabrics treated with the compositions of Example Nos. 1–32 was generally as good as or better than the hand and luster of the fabrics of Comparative Example Nos. 1–4 and the treated fabrics of Comparative Example Nos. 5–25. A particularly pronounced improvement in hand and luster was obtained when the compositions of the invention were applied to olefin fabrics and to acrylic fabrics. Also, significant improvements in hand and luster were obtained when the compositions of the invention were applied to velvet fabrics.

Fabrics treated with compositions of the invention generally performed better in most or all tested respects than corresponding fabrics treated with a composition in which component (a) or component (b) was absent (compare, e.g., Example Nos. 1–3 with Comparative Example Nos. 5–7, Example Nos. 4–6 and 8–15 with Comparative Example Nos. 8–16, Example Nos. 19 and 20 with Comparative Example Nos. 17–19, Example Nos. 21 and 22 with Comparative Example Nos. 20–23, and Example Nos. 23 and 24 with Comparative Example Nos. 24 and 25).

These Examples show that effective performance could be obtained with relatively low treatment levels (see, e.g., Example No. 19), and that a variety of application methods were effective.

COMPARATIVE EXAMPLE NO. 26

An ester containing no aliphatic chlorine was prepared by combining the alcohol $C_8F_{17}C_2H_4OH$ and adipic acid, following the general procedure of Example 8 of U.S. Pat. No. 4,264,484, but without use of epichlorohydrin. A 67:33 weight percent mixture of this ester and the abovedescribed component B3 was applied to olefin flat fabric using the method of Example No. 7. The hand and luster of fabric treated with the composition was inferior to that of the treated fabric of Example No. 7. The SR and WATER/IPA results were the same as for Example No. 7. The OR and OR-ABR results were poorer than for Example No. 7, as the OR rating was 3 (vs. 4.5 for Example No. 7) and the OR-ABR rating was 1 (vs. 4 for Example No. 7).

Various modifications and alterations of this invention will be apparent to those skilled in the art without departing from the scope and spirit of this invention and the latter should not be restricted to that set forth herein for illustrative purposes.

What is claimed is:

1. Fluorochemical compositions comprising a mixture of:
   (a) water-insoluble fluoroaliphatic radical- and aliphatic chlorine-containing ester; and
   (b) water-insoluble fluoroaliphatic radical-containing polymer.

2. Fluorochemical compositions according to claim 1, wherein said ester comprises an ester of a fluoroaliphatic radical- and aliphatic chlorine-containing alcohol and a mono- or polycarboxylic acid.

3. Fluorochemical compositions according to claim 2, wherein said alcohol has the formula:

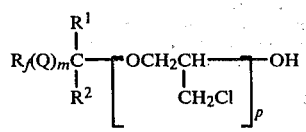

wherein $R_f$ is a fluorinated, monovalent, non-aromatic, aliphatic radical of at least three fully fluorinated carbon atoms, Q is a divalent linking group free of epoxy-reactive and isocyanate-reactive groups, $R^1$ is hydrogen, a $C_{1-6}$ alkyl radical, or a $C_{1-6}$ haloalkyl radical, $R^2$ is hydrogen, a $C_{1-6}$ alkyl radical, a $C_{1-6}$ haloalkyl radical, or a $C_{1-6}$ aryl radical, $R^1$ and $R^2$ can be connected together to form an aromatic or cycloaliphatic structure, and p is greater than zero and less than 10.

4. Fluorochemical compositions according to claim 2, wherein said ester comprises an adipate, phthalate, or citrate ester.

5. Fluorochemical compositions according to claim 1, wherein said ester comprises a carbamate ester of a fluoroaliphatic radical- and aliphatic chlorine-containing alcohol and an organic isocyanate.

6. Fluorochemical compositions according to claim 1, wherein said polymer comprises a polymer of one or more monomers having the formula $R_f'P$, where $R_f'$ is a fluorinated, monovalent, non-aromatic, aliphatic radical of at least three fully fluorinated carbon atoms, and P is a polymerizable group.

7. Fluorochemical compositions according to claim 6, wherein $R_f'P$ comprises a fluoroaliphatic acrylate or methacrylate monomer.

8. Fluorochemical compositions according to claim 1, wherein said polymer comprises a polymer of $R_f'SO_2N(R)C_2H_4OOCCH=CH_2$, wherein $R_f'$ is a fluorinated, monovalent, non-aromatic, aliphatic radical of at least three fully fluorinated carbon atoms and R is H or a $C_{1-6}$ alkyl radical.

9. Fluorochemical compositions according to claim 1, wherein said polymer comprises a polymer of $R_f'C_2H_4OOCC(CH_3)=CH_2$, wherein $R_f'$ is a fluorinated, monovalent, non-aromatic, aliphatic radical of at least three fully fluorinated carbon atoms.

10. Fluorochemical compositions according to claim 1, wherein said ester and said polymer each have at least one major transition temperature above about 25° C.

11. Fluorochemical compositions according to claim 1, wherein said ester and said polymer are combined in a weight ratio between about 1:10 to 10:1.

12. Fluorochemical compositions according to claim 1, wherein said ester comprises an adipate ester of the alcohol

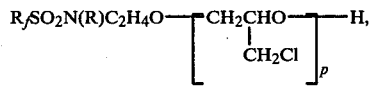

wherein $R_f$ is a fluorinated, monovalent, non-aromatic, aliphatic radical of at least three fully fluorinated carbon atoms, R is H or a $C_{1-6}$ alkyl radical, and p is between about 1 and 5, said polymer comprises a polymer of $R_f'SO_2N(R')C_2H_4OOCH=CH_2$, wherein $R_f'$ is a fluorinated, monovalent, non-aromatic, aliphatic radical of at least three fully fluorinated carbon atoms, R' is H or a $C_{1-6}$ alkyl radical, and wherein said ester and said polymer are combined in a weight ratio between about 1:10 and 10:1.

13. Oil- and water-repellant articles treated with a composition according to claim 1.

14. A process for rendering an article durably oil- and water-repellant, comprising the steps of contacting said article with a liquid composition comprising a composition according to claim 1, and drying said liquid composition on said article.

UNITED STATES PATENT AND TRADEMARK OFFICE
CERTIFICATE OF CORRECTION

PATENT NO. : 4,426,476
DATED : January 17, 1984
INVENTOR(S) : John C. C. Chang

It is certified that error appears in the above—identified patent and that said Letters Patent is hereby corrected as shown below:

Column 2, line 35, 'as F"ure-' should read -- as "ure- --.

Column 4, line 1, "mehthod" should read -- method --.

Column 9, line 66, "abovedescribed" should read -- above-described --.

Column 10, line 49, "and not" should read -- and are not --.

Columns 13-14, line 17 in the text following the table, "containingcomponent" should read -- containing component --.

Signed and Sealed this

Twenty-sixth Day of February 1985

[SEAL]

Attest:

DONALD J. QUIGG

Attesting Officer     Acting Commissioner of Patents and Trademarks